No. 772,369. PATENTED OCT. 18, 1904.
J. E. PARRISH.
GOVERNOR OR REGULATING VALVE.
APPLICATION FILED DEC. 15, 1902.
NO MODEL.

Witnesses
Carl S. Replogle.
D. G. Moran.

Inventor
Justin E. Parrish
By D. B. Replogle
Attorney

No. 772,369.

Patented October 18, 1904.

UNITED STATES PATENT OFFICE.

JUSTIN E. PARRISH, OF SCRANTON, PENNSYLVANIA.

GOVERNOR OR REGULATING VALVE.

SPECIFICATION forming part of Letters Patent No. 772,369, dated October 18, 1904.

Application filed December 15, 1902. Serial No. 135,203. (No model.)

*To all whom it may concern:*

Be it known that I, JUSTIN E. PARRISH, a citizen of the United States, residing at Scranton, in the county of Lackawanna and State of Pennsylvania, have invented certain new and useful Improvements in Governor or Regulating Valves, of which the following is a specification.

This invention relates to valves governing or regulating the flow of liquids, such as may be used for cutting off the supply in a pipe leading to a flushing-tank, oil-tank, or the like; and the objects of the invention are to provide a regulation-valve in which the actuating-float is directly connected to the delivery-pipe, to render such valves more sensitive, to protect the float operating said valves from becoming weighted with the liquid in which it floats, to simplify the construction of such valves, and to render them more efficient generally.

To these ends the invention consists of the construction, arrangement, and combination of the several parts, as herein specified, and illustrated in the accompanying drawings, in which—

Figure 2:
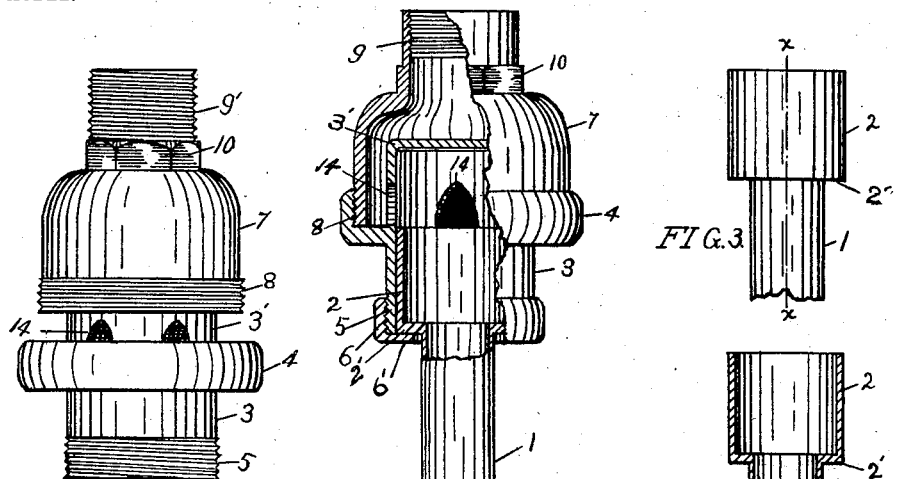
Figure 3:
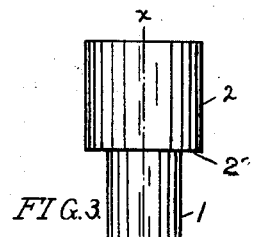
Figure 4:
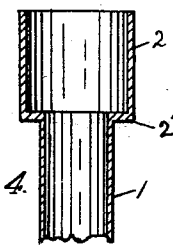
Figure 5:
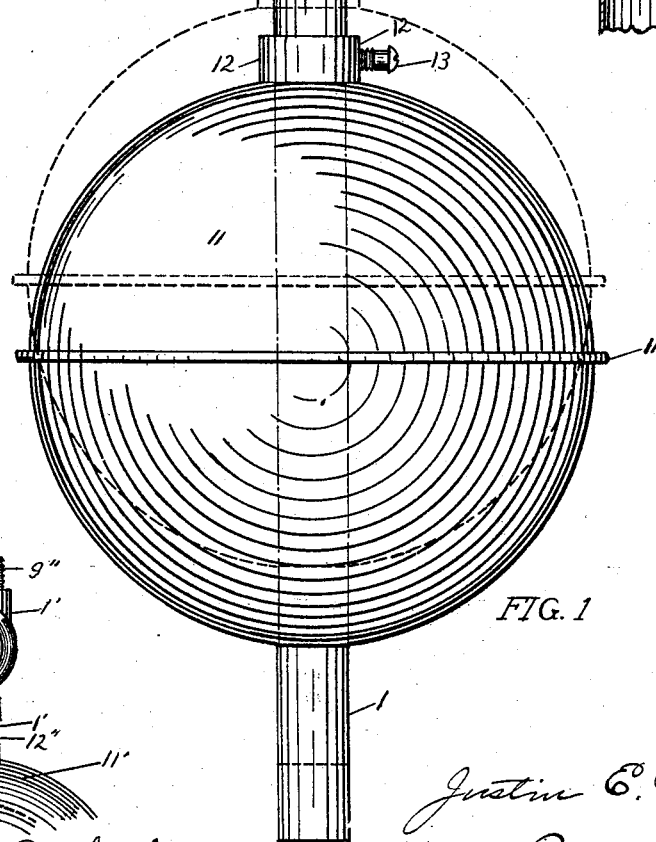
Figure 1:
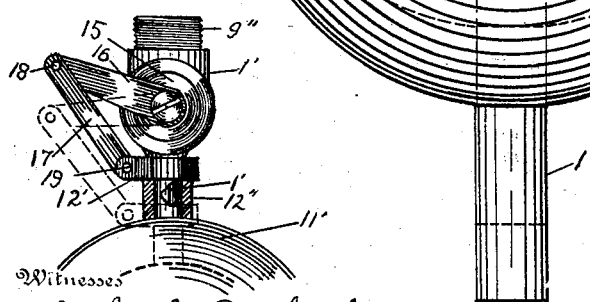

Figure 1 is a side elevation, partly in section, with a part of the valve-casing broken away. Fig. 2 is a view of several members of a modified form of the valve, partially separated from each other. Fig. 3 is a view in detail, showing the construction of the upper end of the float-stem when a sliding valve is used. Fig. 4 is a view in cross-section, taken on the line *x x* of Fig. 3. Fig. 5 is a substitute form embodying my invention as applied to a turn-valve located in the delivery-pipe.

Similar characters of reference denote like and corresponding parts throughout the several views.

Referring to the drawings, 1 denotes a section of a delivery-pipe utilized as a float-stem for the float 11, having on its upper end the hollow cylindrical valve 2, which is slidable within the inner valve-casing 3, having an internally-threaded flange 4 and an externally-threaded rim 5, adapted to be screwed into an internally-threaded ring 6, having an annular flange 6', on which the shoulder 2' of the valve 2 rests when the valve is fully open. An outer valve-casing 7, having an external screw-thread 8, has a screw-threaded connection with the flange 4, the said member 7 being provided with a wrench-shank 10 and a threaded pipe connection 9 or 9', according as it is to be connected with an external or an internal thread of a pipe. Integrally constructed with the member 3 is the dome 3', having ports 14 14, &c., which lead from the interior of the member 7 to the interior of the delivery-pipe and float-stem 1. The float 11 is preferably a hollow sphere constructed from sheet metal and is secured to the pipe or stem 1 by means of a sheath or collar 12 sliding thereon and provided with a set-screw 13 in said collar 12, arranged to engage with the pipe or stem 1 at any suitable position.

In the substitute form shown in Fig. 5 a pipe 1', adapted to be connected to the delivery-pipe by means of the threaded shank 9" and being provided with the ordinary turn-valve 15, is shown. When this form is used, the sheath 12", sliding on the hollow pipe 1' and connected with the float 11', operates the turn-valve by means of the levers 16 and 17, pivoted together at 18 and to the collar 12' at 19.

I do not wish to be confined to the exact descriptions shown and described, as I have shown a typical slide-valve and typical turn-valve embodying my invention. Many of the details in either form might be varied without departing from the general spirit thereof.

The operation of the device is now readily explained.

Let the threaded shank 9, 9', or 9", as the case may be, be connected to a vertical delivery-pipe delivering liquid downward into a tank or reservoir, the liquid passing through the interior of the pipe 1 or 1', filling the tank within the body of which the float 11 or 11' hangs. Now supposing the form in Fig. 1 is used, the flow being delivered through the interior of the outer valve-casing 7 through the ports 14 14 will not be interrupted until the liquid in the tank reaches the float 11, when the buoyant force thereof is designed to lift the said float, sliding the cylindrical cut-off 2 over the ports 14 on the interior of the dome 3'. When it has been raised to the position shown in the dotted lines in Fig. 1, the entire flow is cut off; but the ports 14 being cut in the form of pointed arches a gradually-decreasing portion of the flow is cut off during the consecutive stages of the lifting of the valve, whereby the flow is controlled or kept equivalent to any continuous or intermittent drainage or waste from the tank below.

The operation of the substitute form shown in Fig. 5 is as readily understood. The position shown in full lines in Fig. 5 indicates the valve as being closed or absolutely shut off; but when the float 11' is not supported by the liquid in the body of the tank the float is dropped downward into the position of the dotted lines or any position intermediate between the two, in which position the turn-valve allows the liquid to pass at such rate as is required.

Having thus described my invention, what I claim, and desire to secure by Letters Patent, is—

In a regulating-valve, a valve-casing, comprising a member having a threaded nipple, a member connected thereto having a portion of less diameter than the portion connected to the first-named member and a ring partially inclosing the end of the second-named member; the said second-named member having a dome provided with ports; said dome standing parallel with the wall of the first-named member; and in combination therewith, a valve slidable in the dome and second-named member, a combined valve-stem and pipe integral with the valve extending through the end of the second-named member and a float for actuating the valve-stem.

In testimony whereof I affix my signature in presence of two witnesses.

JUSTIN E. PARRISH.

Witnesses:
P. P. SMITH,
F. J. DE LACEY.